July 1, 1924.

A. T. KASLEY 1,499,371

UNIVERSAL JOINT

Filed March 2, 1921

A. T. Kasley
INVENTOR

BY

ATTORNEY

Patented July 1, 1924.

1,499,371

UNITED STATES PATENT OFFICE.

ALEXANDER T. KASLEY, OF ESSINGTON, PENNSYLVANIA, ASSIGNOR TO WESTING-HOUSE ELECTRIC AND MANUFACTURING COMPANY, A CORPORATION OF PENNSYLVANIA.

UNIVERSAL JOINT.

Application filed March 2, 1921. Serial No. 448,973.

*To all whom it may concern:*

Be it known that I, ALEXANDER T. KASLEY, a citizen of the United States, and a resident of Essington, in the county of Delaware and State of Pennsylvania, have invented a new and useful Improvement in Universal Joints, of which the following is a specification.

My invention relates to a coupling or universal joint for members or shafts to be coupled and has for its object to provide apparatus of the character designated which shall be capable of allowing relative displacement of the members or shafts with little frictional loss.

It is old in the art to provide couplings or universal joints in which one member may move longitudinally, laterally, and angularly relatively to the other. However, couplings of this type, known to me, do not always operate satisfactorily, especially when operating at high speeds or transmitting high powers. This is doubtless due to improperly designed structures and the inherently large frictional losses which, of course, are magnified under heavy loads. Accordingly, I have devised a shaft coupling or universal joint which is durable and which operates with a high degree of efficiency for coupling a high-speed and high-power shaft, for example, a turbine shaft, to a shaft to be driven. My coupling comprises yoke members provided with bearing faces, and there are interposed between the bearing faces transmission members or struts having curved bearing ends, whereby the struts may roll on the bearing faces, should there be any tendency to longitudinal separation of the coupled members, thereby eliminating sliding friction. The struts or transmission members are torsionally flexible in order that one shaft or member may move angularly with reference to the other shaft or member. Lateral displacement of one shaft or member relatively to the other is taken care of by providing two couplings.

Apparatus embodying features of my invention is shown in the accompanying drawings wherein.

Figure 1:
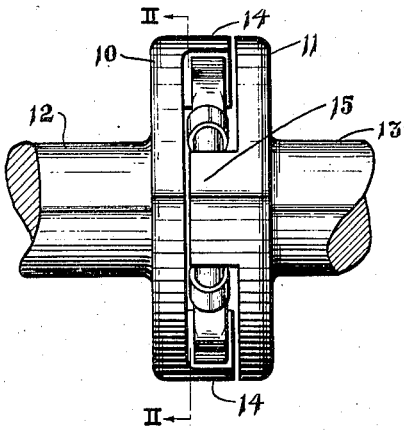
Fig. 1 is a view in side elevation of my improved form of coupling.
Figure 2:
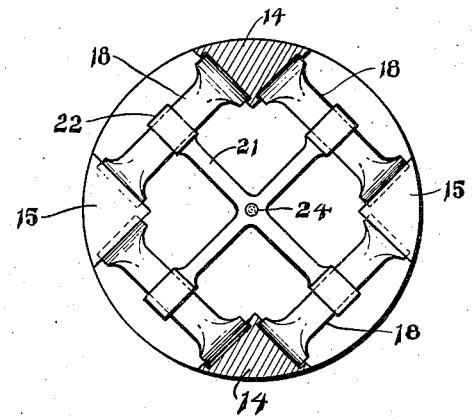
Fig. 2 is a sectional view along the line II—II of Fig. 1.
Figure 3:
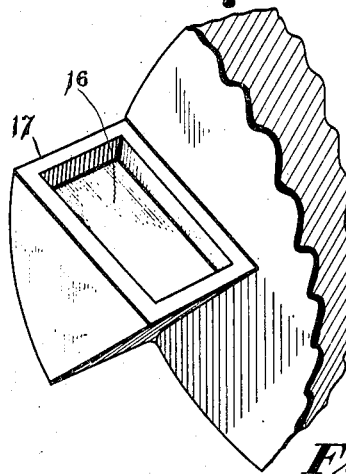
Fig. 3 is a detail view showing one of the seats of a coupling member projection.
Figure 4:
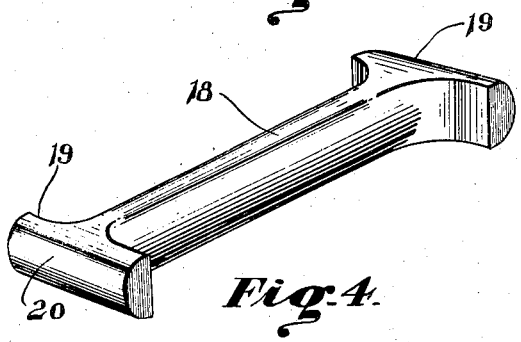
Fig. 4 is a detail view in perspective of a transmission member or strut.

In Fig. 1 of the drawings, I show coupling members 10 and 11 secured to shafts 12 and 13, respectively, by any appropriate means and having diametrically opposed lugs or projections 14 and 15, respectively, extending in directions substantially parallel to the axis of the respective members. Each of the projections is provided with a bearing seat 16 surrounded by a wall 17, as may be more clearly seen from Fig. 3. The seats 16 of a projection are disposed substantially at right angles to each other and opposed seats 16 of adjacent lugs or projections of the two members are substantially parallel.

The lugs or projections 15 are normally arranged at right angles to the lugs or projections 14 and transmission members or struts 18 are interposed between the adjacent lugs or projections. Each strut comprises a cylindrical portion with enlarged ends 19 having curved bearing surfaces 20, preferably elements of a cylinder whose axis is a median-transverse axis of the strut, adapted to bear against seats 16 so as to roll on the seats in the direction of the length of the coupled shafts or members. The struts are torsionally flexible between the enlarged ends for a purpose to be more fully hereinafter set forth.

A flexible spider 21 has retaining portions 22 fitting about intermediate cylindrical portions of the transmission members or struts for the purpose of assisting in holding the struts in place as well as in opposing centrifugal forces developed by the struts in operation. The spider is held in place relatively to one of the members by a central pin 24. The spider may bend or deflect torsionally in order to yield to different positions assumed by the struts in operation.

From the structure so far described, it will be seen that, if one shaft or member is moved longitudinally with respect to the other shaft or member, each of the struts will tilt about an intermediate transverse axis, the surfaces 20 rolling on the seats 16. If one shaft or member is moved angularly with respect to the other, the enlarged ends 19 being unable to slide due to pressure contact, the struts are constrained to deflect torsionally in order to take care of the angular motion of their seats relatively to each other and the curved bearing surfaces roll on the seats 16 in order to take care of the translatory movement of one set of lugs or projections with respect to the other set.

Figure 5:
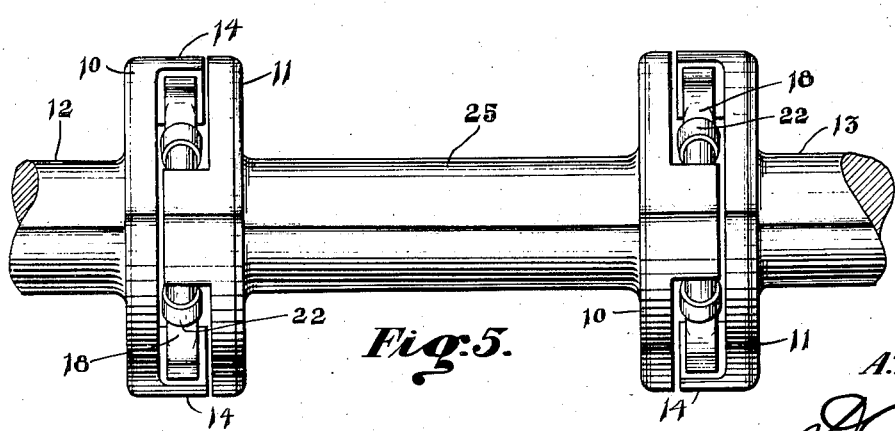
Fig. 5 is an elevational view showing two of my couplings interposed between the coupled members.

Fig. 5 shows a construction in which two couplings are employed connected by an intermediate shaft section 25 in order that the shafts or members 12 and 13 may move laterally with respect to each other as well as angularly and longitudinally.

From the above description, the operation of my invention is apparent. Power is supplied to one of the shafts or members 12 or 13 in order to drive the other shaft or member. Should one shaft or member tend to move longitudinally with respect to the other, the transmission members or struts would rock or roll on the seats 16 to permit of the relative longitudinal movement of the shafts or members. Angular movement of one shaft or member is permitted by a combined rocking or rolling movement of the transmission members or struts and a torsional deflection thereof. If it is desired to have an arrangement which will permit of lateral movement of one shaft or member with respect to the other, then two couplings, as shown in Fig. 5, are employed.

From the foregoing, it will be seen that I have devised a relatively strong coupling which is capable of allowing relative longitudinal, angular and lateral movements of the coupled members without any sliding friction taking place between any of the members.

While I have shown my invention in but one form, it will be obvious to those skilled in the art that it is not so limited but is susceptible of various other changes and modifications, without departing from the spirit thereof and I desire, therefore, that only such limitations shall be placed thereupon as are imposed by the prior art or as are specifically set forth in the appended claims.

What I claim is:

1. In a shaft coupling, the combination of a pair of coupling members, projections carried by the coupling members, struts interposed between the projections and capable of rolling motion relative thereto, and a separate means cooperating with one of the coupling members and with the struts to resist centrifugal force developed thereby in operation.

2. In a shaft coupling, the combination of a pair of coupling members, two diametrically-opposed projections carried by each member and each projection having bearing seats disposed at right angles to each other and each seat being surrounded by a non-circular confining wall, torsionally-flexible struts interposed between the projections and having ends curved as cylindrical elements to bear against the seats and being shaped to conform to the confining walls, and retaining means secured to one of the coupling members for resisting centrifugal force developed by the struts in operation.

3. In a shaft coupling, the combination of a pair of coupling members, projections carried by the coupling members, torsionally flexible struts interposed between the projections and capable of rocking motion relative thereto, said struts rocking upon relative longitudinal movement of the coupling members and rocking and torsionally deflecting upon relative angular movement between the members, and flexible confining means cooperating with the struts for resisting centrifugal force developed thereby in operation.

4. In a shaft coupling, the combination of a pair of coupling members, projections carried by the coupling members, torsionally flexible struts interposed between the projections and capable of rocking motion relative thereto, said struts rocking upon relative longitudinal movement of the coupling members and rocking and torsionally deflecting upon relative angular movement between the members, a flexible spider cooperating with the struts to resist centrifugal force developed thereby in operation, and supporting means for the spider.

5. In a shaft coupling, the combination of a pair of coupling members, projections carried by the coupling members, torsionally flexible struts interposed between the projections and capable of rocking motion relative thereto, said struts rocking upon relative longitudinal movement of the coupling members and rocking and torsionally deflecting upon relative angular movement between the members, a flexible spider cooperating with the struts to resist centrifugal force developed thereby in operation, and means carried by one of the coupling members for supporting the spider.

6. In a shaft coupling, the combination of a pair of coupling members, projections carried by the coupling members, and struts interposed between the projections, the engaging surfaces of said projections and said struts having such relatively dissimilar contours as to induce a rolling contact therebetween during relative movements of the coupling members.

7. In a shaft coupling, the combination of a pair of coupling members, projections carried by the coupling members, and struts interposed between the projections, said struts having ends curved substantially as cylindrical elements and engaging substantially flat seats provided in the projections.

8. In a shaft coupling, the combination of a pair of coupling members, projections carried by each of the coupling members having seats provided therein, struts disposed between and engaging the seats provided in the projections of the members, and a spider for radially maintaining each of said struts in a substantially central position with respect to its coacting seats.

9. In a shaft coupling, the combination of a pair of coupling members, projections carried by each of the coupling members and extending substantially parallel to the respective axes thereof, struts disposed between the projections of the members, and a flexible spider cooperating with the struts to oppose centrifugal force developed thereby in operation.

10. In a shaft coupling, the combination of a pair of coupling members, projections carried by each of the coupling members and extending substantially parallel to the respective axes thereof, struts disposed between the projections of the members, and a flexible spider secured to one of the coupling members and having arms cooperating with the intermediate portions of the struts to resist centrifugal force developed thereby in operation.

11. A shaft coupling comprising a pair of coupling members, lugs or projections carried by each member, and transmission members between the projections of one member and the projections of the other member and having the ends thereof shaped as cylindrical elements to roll on the substantially flat surfaces of the projections upon relative longitudinal movement of one coupling member with respect to the other.

12. A shaft coupling comprising a pair of coupling members, diametrically opposed lugs or projections carried by each member, each lug having flat bearing seats, a bearing seat of one projection in normal operation being parallel to an opposing seat of the projection of the other member, and transmission members interposed between opposed seats and having curved ends whereby the members may roll about an intermediate axis upon relative longitudinal motion of one member with respect to the other.

13. A shaft coupling comprising a pair of coupling members, diametrically opposed lugs or projections carried by each member, each projection or lug having bearing faces extending in an even plane, struts having curved faces cooperating with the bearing faces, and a retaining member cooperating with the struts for maintaining them in position and for opposing centrifugal effects.

14. A shaft coupling comprising a pair of coupling members, diametrically opposed lugs or projections carried by each member, each lug or projection having straight bearing seats arranged substantially at right angles to each other and the seats of adjacent lugs being substantially parallel in operation, struts, having enlarged ends provided with surfaces curved about a substantially radial axis bearing against the straight seats and capable of rolling about the intermediate radial axis upon longitudinal motion of some of the lugs with respect to the others.

15. A shaft coupling comprising a pair of coupling members, diametrically opposed lugs or projections carried by each member, each lug or projection having flat bearing seats substantially at right angles to each other and the opposed bearing seats of adjacent lugs of the two members being substantially parallel in normal operation, struts having intermediate portions capable of torsional deflection and enlarged ends provided with curved surfaces bearing against the flat seats of the lugs or projections whereby one coupling member may move longitudinally with respect to the other coupling member or whereby the axis of one member may be angularly disposed with respect to the axis of the other.

16. A shaft coupling comprising a pair of coupling members, diametrically opposed lugs or projections carried by each member, each lug or projection having seats disposed substantially at right angles to each other and the opposed seats of adjacent lugs or projections of the two members being substantially parallel, struts between the projections and having cylindrical surface elements bearing against the seats whereby the struts may rock about an intermediate axis when there is relative longitudinal movement between said members, said struts being capable of twisting or torsional deflection whereby upon angular movement of one member with respect to the other said struts may roll on their cylindrical surface elements and be twisted or torsionally deflected about their major axes, and means asociated with said struts for holding them in place and for opposing centrifugal force.

17. A shaft coupling, comprising a pair of coupling members, diametrically opposed lugs or projections carried by each member, each projection having bearing seats disposed substantially at right angles to each other and opposed seats of adjacent lugs or projections of the members being substantially parallel, struts interposed between the projections, each strut comprising an intermediate portion capable of twisting or torsional deflection and with enlargements at the ends having curved bearing surface elements fitting said seats, the curved surfaces cooperating to allow the struts to rock or roll about intermediate transverse axes upon translatory motion of one set of lugs with respect to the other set of lugs and capable of twisting or deflection upon angular motion of one set of lugs with respect to the other set of lugs.

18. A shaft coupling comprising a pair of coupling members, interfitting projections carried by the coupling members, each projection having seats at opposite sides disposed at right angles to each other and each seat being surrounded by a rectangular confining wall, and torsionally flexible struts having ends shaped as cylindrical elements to bear against the seats and conforming to the outline of the confining walls so that the struts may rock upon the seats without sliding rotatably thereon.

19. In a shaft coupling, the combination of a pair of coupling members, projections carried by the coupling members, and struts interposed between the projections, the ends of the struts each making substantially a line contact with the projection coacting therewith.

In testimony whereof, I have hereunto subscribed my name this 25th day of February, 1921.

ALEXANDER T. KASLEY.